United States Patent
Hulick, Jr.

(10) Patent No.: US 11,962,666 B2
(45) Date of Patent: Apr. 16, 2024

(54) USER-CONFIGURABLE END USER MONITORING (EUM)

(71) Applicant: Cisco Technology, Inc., San Jose, CA (US)

(72) Inventor: Walter Theodore Hulick, Jr., Pearland, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 16/793,065

(22) Filed: Feb. 18, 2020

(65) Prior Publication Data

US 2021/0258396 A1 Aug. 19, 2021

(51) Int. Cl.
*H04L 67/564* (2022.01)
*H04L 67/01* (2022.01)
*H04L 67/75* (2022.01)

(52) U.S. Cl.
CPC ............ *H04L 67/564* (2022.05); *H04L 67/01* (2022.05); *H04L 67/75* (2022.05)

(58) Field of Classification Search
CPC ..... H04L 67/2819; H04L 67/36; H04L 67/42; H04L 67/564; H04L 67/01; H04L 67/75
See application file for complete search history.

(56) References Cited

U.S. PATENT DOCUMENTS

| | | | | |
|---|---|---|---|---|
| 7,941,525 B1* | 5/2011 | Yavilevich | .............. | H04L 67/02 709/224 |
| 9,706,521 B1* | 7/2017 | Oroskar | .............. | H04W 72/085 |
| 2002/0083188 A1* | 6/2002 | Hericy | .................. | G06F 16/957 709/235 |
| 2008/0117201 A1* | 5/2008 | Martinez | ............... | G06F 16/437 345/418 |
| 2010/0269044 A1* | 10/2010 | Ivanyi | ................. | H04L 41/5067 715/736 |
| 2012/0023487 A1* | 1/2012 | Letca | ...................... | H04L 67/42 717/130 |
| 2012/0265824 A1* | 10/2012 | Lawbaugh | .......... | G06F 11/3089 709/206 |
| 2014/0189107 A1* | 7/2014 | Kalavade | ............ | H04L 12/1859 709/224 |
| 2014/0280867 A1* | 9/2014 | Burch | ..................... | H04L 43/08 709/224 |

(Continued)

OTHER PUBLICATIONS

Wang, Zhiheng, "Navigation Timing", W3C Recommendation, online: https://www.w3.org/TR/navigation-timing/, Dec. 17, 2012, 17 pages, W2.org.

*Primary Examiner* — Chris Parry
*Assistant Examiner* — Steven C Nguyen
(74) *Attorney, Agent, or Firm* — BEHMKE INNOVATION GROUP LLC; James M. Behmke; James J. Wong

(57) ABSTRACT

In one embodiment, webpage data for a webpage is downloaded by a web browser executed by a client device. The client device inserts instrumentation into the webpage data to collect event metrics for events associated with the webpage. The client device selects, based on a user-defined policy, a set of event metrics from among the collected event metrics to be shared with a proxy service. The client device sends the selected set of event metrics to the proxy service. The proxy service provides access to the set of event metrics to one or more collectors registered with the proxy service.

20 Claims, 21 Drawing Sheets

(56) References Cited

U.S. PATENT DOCUMENTS

| | | | |
|---|---|---|---|
| 2017/0078419 A1* | 3/2017 | Yavilevich | H04L 67/535 |
| 2018/0131592 A1* | 5/2018 | Purushothaman | H04L 67/125 |
| 2019/0124471 A1* | 4/2019 | Chelnik | H04L 51/214 |
| 2019/0238424 A1* | 8/2019 | Guan | H04L 41/5041 |
| 2020/0151083 A1* | 5/2020 | Chauhan | G06F 11/0751 |
| 2020/0382529 A1* | 12/2020 | Higgins | H04L 43/0876 |

* cited by examiner

800

| | |
|---|---|
| OpenEUM for the Cloud Community | |
| Update OpenEUM Instrumentation | |
| Measure Performance for every page | |
| Execute and measure Performance on this page now | |
| ✓ Show Performance Chart After Execution | |
| ✓ Send Performance Events After Execution | |
| Only Show Charts (if enabled) and Send Events (if enabled) for Slow Pages | ▲ |
| This Can Read and Change Site Data | |
| Options | |
| Remove from Chrome... | |
| Hide in Chrome Menu | |
| Manage Extensions | |
| Inspect Popup | |

FIG. 8

OpenEUM Proxy Server Management

Show Stats
Show Config
Show Log
Show Collectors

OpenEUM Proxy Server Events

Show Page Load Events - In Order
Show Page Load Events - Top Latency
Show Web Service Call Events - In Order
Show Web Service Call Events - Top Latency

OpenEUM User Signup

Download Extension.crx file

OpenEUM Collector Signup

Collector Registration

OpenEUM Demo Menu

Launch Demo
Test Appdynamics

FIG. 14

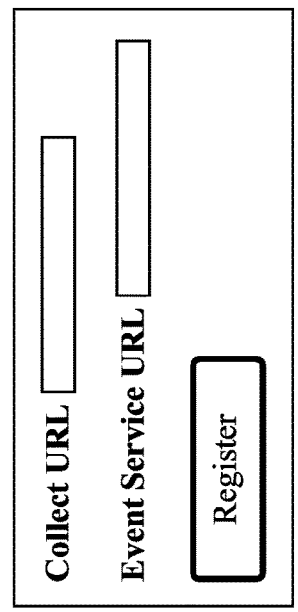

USER-CONFIGURABLE END USER MONITORING (EUM)

TECHNICAL FIELD

The present disclosure relates generally to computer systems, and, more particularly, to user-configurable end user monitoring (EUM).

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Today, end user monitoring (EUM) solutions are controlled solely by the owners of the application/website accessed by the user. Hence, the user never sees any of the results of the monitoring and, in fact, has no knowledge that their browser is reporting performance metrics, which is a privacy concern. Such solutions are also highly limited in terms of which stakeholders have access to the performance metrics. Indeed, quality assurance (QA) personnel, developers, support personnel, and the like, are often shut out from reviewing actual EUM metrics. Further, because the EUM system is traditionally implemented at the server side, this also makes it difficult to gauge the performance of other applications/websites, such as those of partners, without using synthetics or locally enabling developer mode, which is far too technical for most users.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates an example EUM browser extension menu;

FIG. 14 illustrates an example menu for managing an EUM proxy service;

FIG. 15 illustrate an example GUI to register an EUM collector with an EUM proxy service.

DESCRIPTION OF EXAMPLE EMBODIMENTS

Overview

Figure 1A:
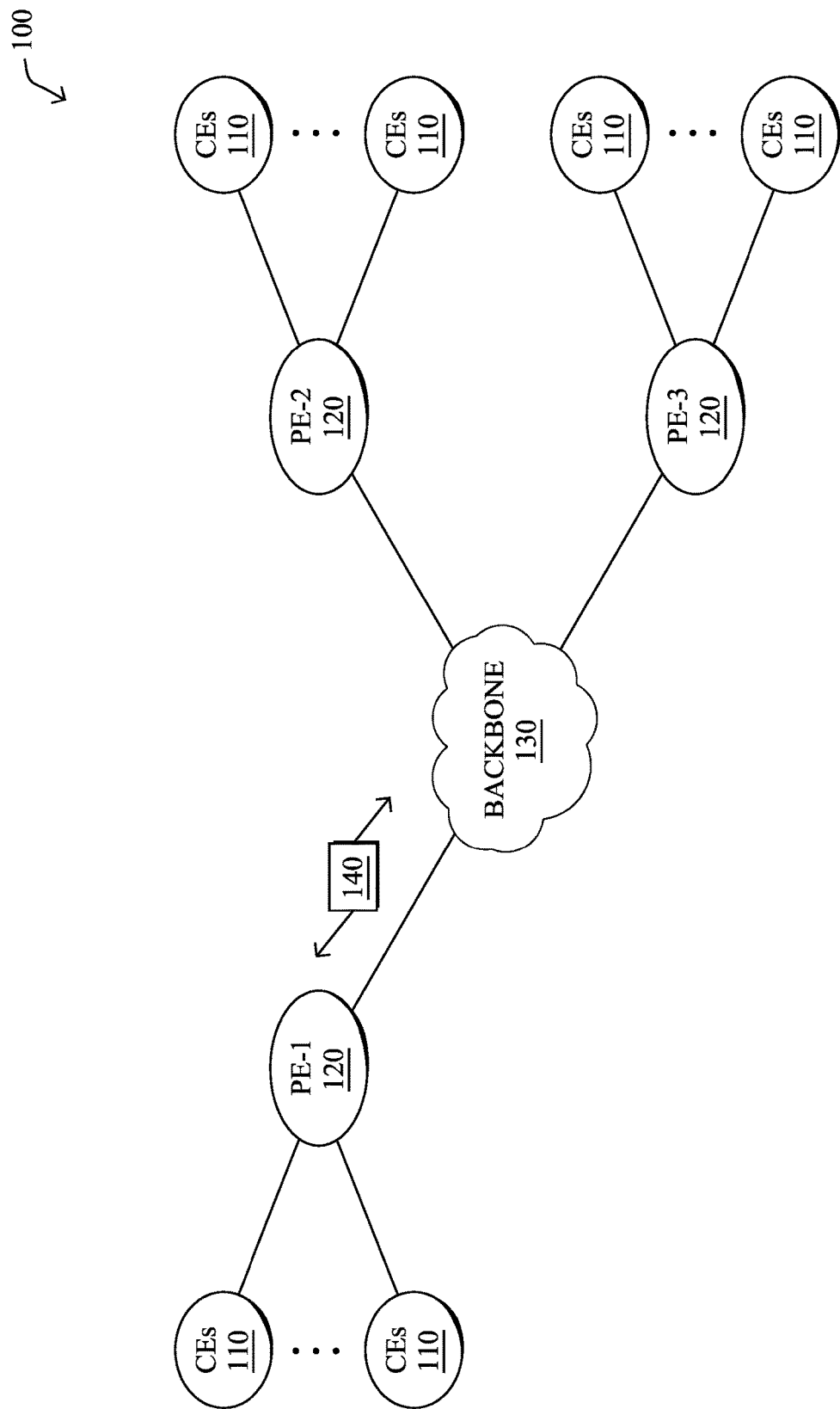
FIGS. 1A-1B illustrate an example computer network.

According to one or more embodiments of the disclosure, webpage data for a webpage is downloaded by a web browser executed by a client device. The client device inserts instrumentation into the webpage data to collect event metrics for events associated with the webpage. The client device selects, based on a user-defined policy, a set of event metrics from among the collected event metrics to be shared with a proxy service. The client device sends the selected set of event metrics to the proxy service. The proxy service provides access to the set of event metrics to one or more collectors registered with the proxy service.

Other embodiments are described below, such as optionally including an identity of an upstream interaction of an interaction instance, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
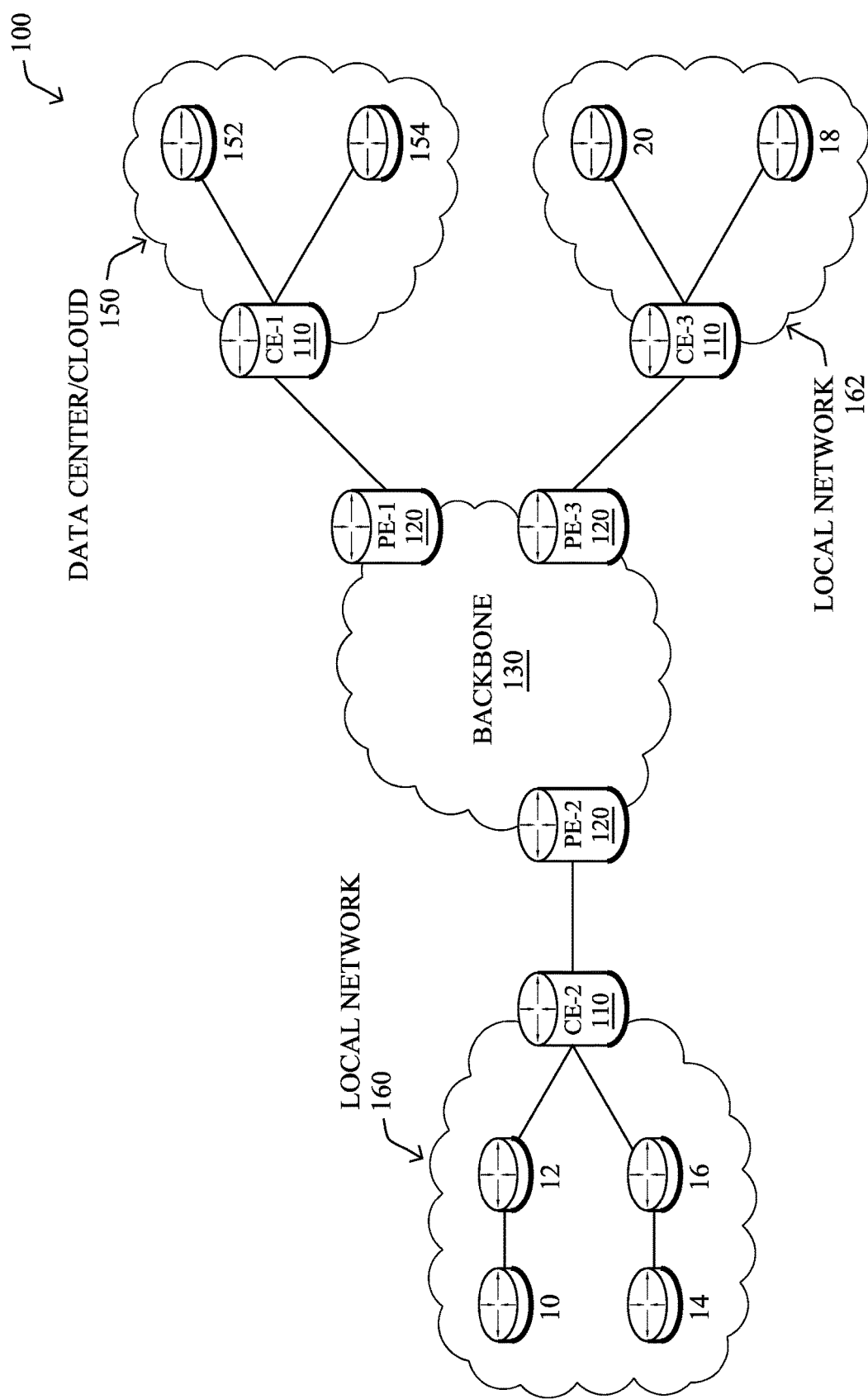

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
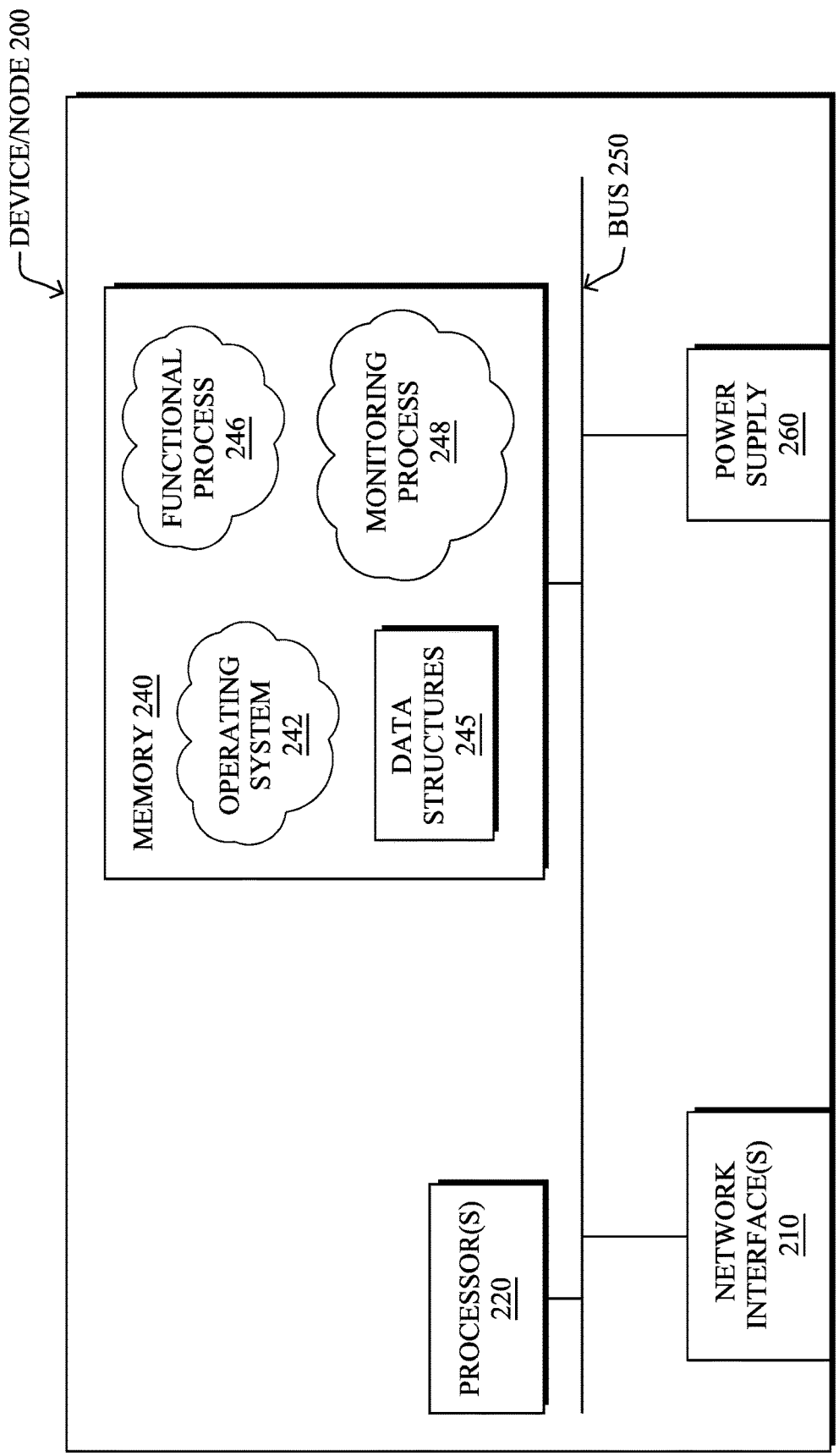
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Application Intelligence Platform

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
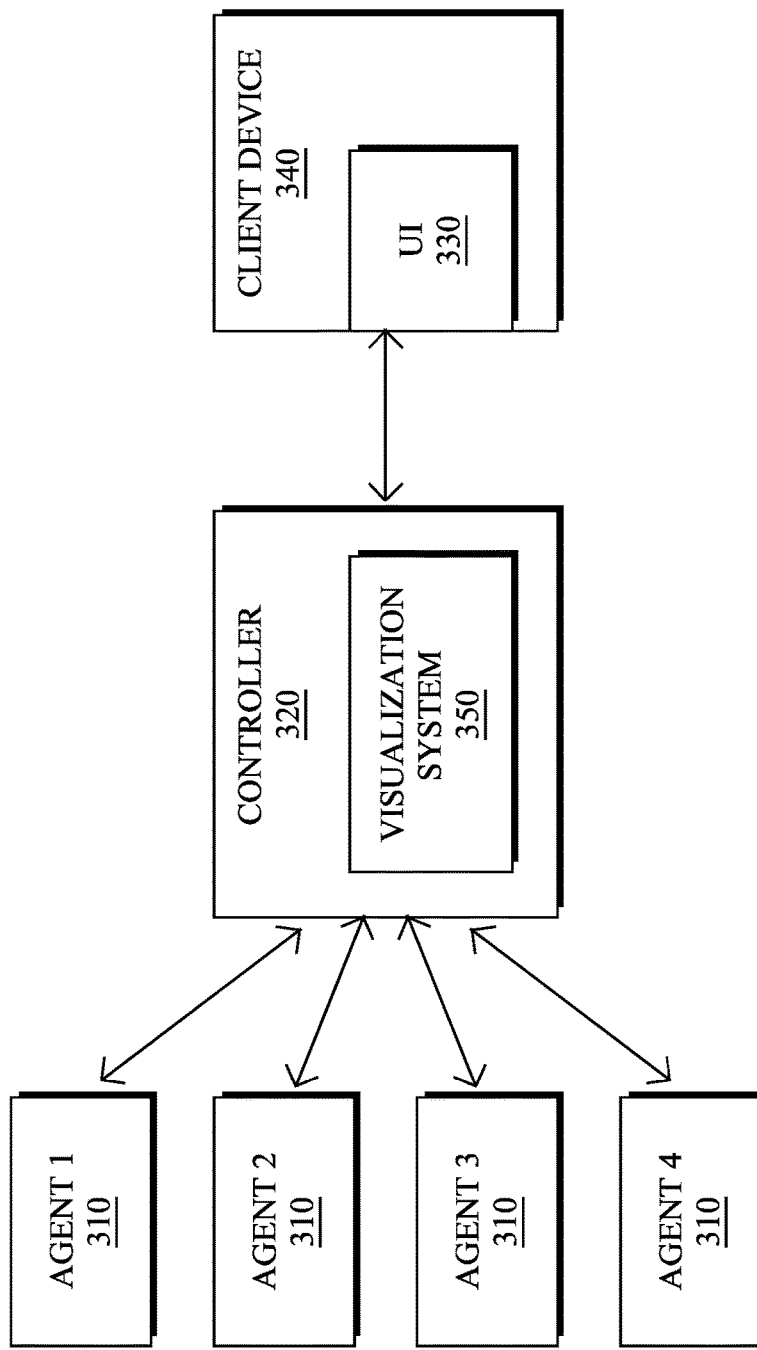
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
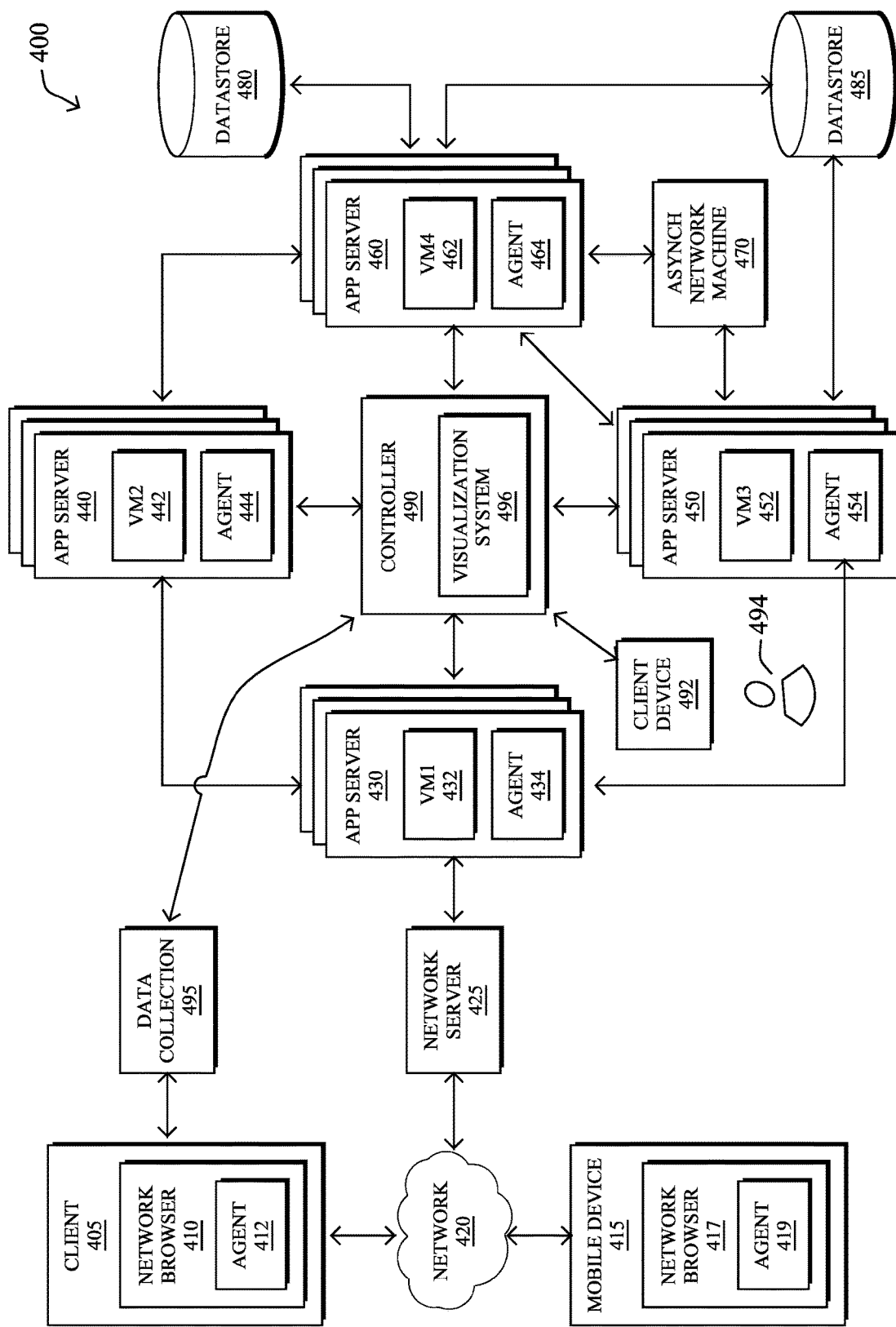
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
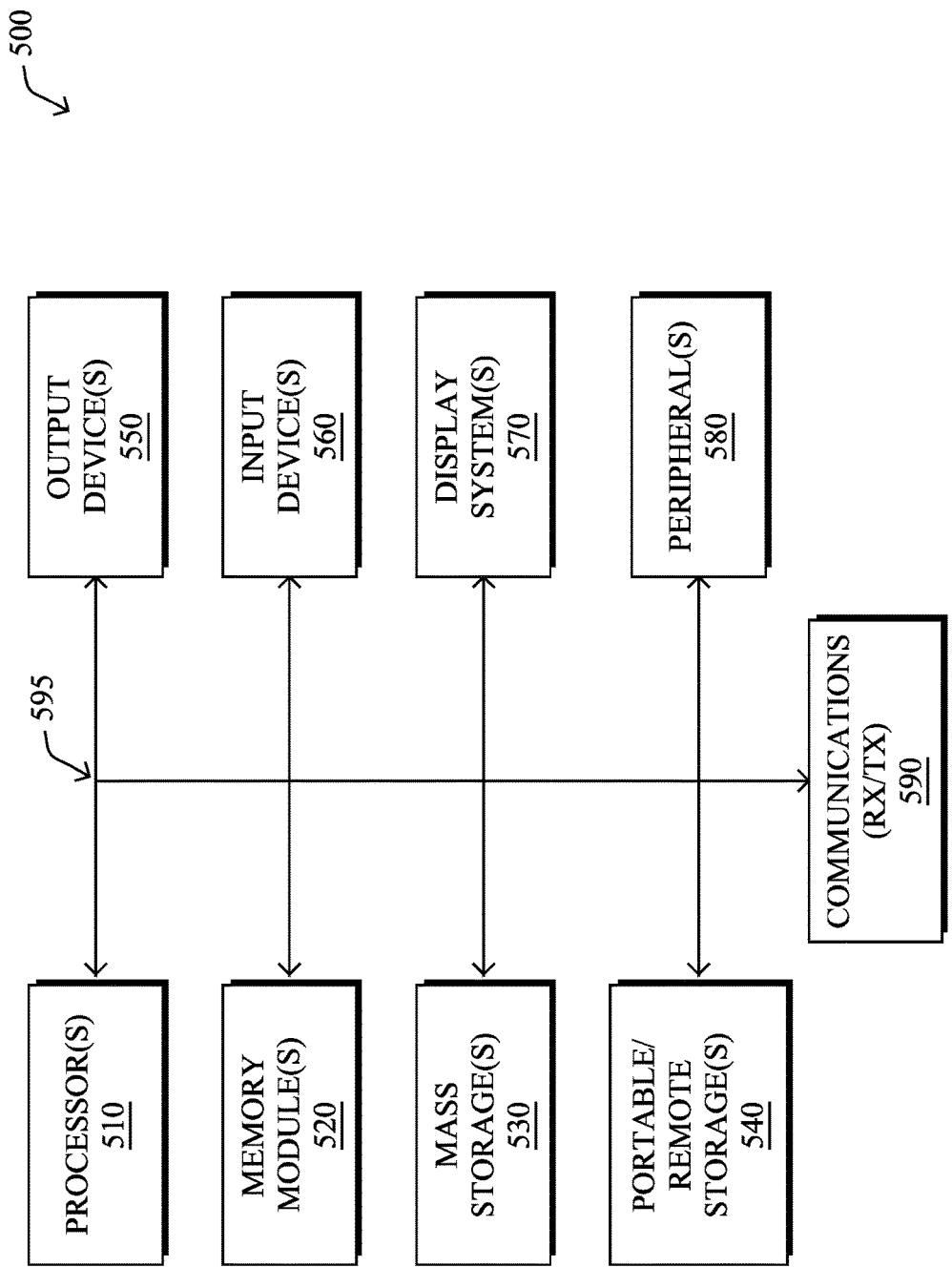
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

User-Configurable End User Monitoring (EUM)

As noted above, end user monitoring may be performed using browser agents and mobile agents to provide performance information from the point of view of the client device. In general, EUM can be achieved in a number of way and can vary in terms of:
  Where the instrumentation is placed
  How the instrumentation is placed
  Instrumentation complexity
  Changes in the user environment to apply the instrumentation
  Visibility supplied by the instrumentation Despite the above variations, EUM implementations typically adopt a common architecture whereby an application performance monitor (APM) vendor supplies the following to an application provider that wants to monitor end users of their application:
  A bootstrap script that is either manually inserted into the application-generated pages or inserted into those pages by a proxy
  A server platform hosted by the application provider that hosts the instrumentation script required by the bootstrap script, receives events generated by the instrumentation script, and provides a user interface (UI) and/or analysis system that generates metrics/analytics from the received events.

More specifically, typical EUM implementations take the form of one of the following:
  Network monitor (e.g., RUM)—this is an older style way of monitoring EUM that requires close proximity to the servers and, in general, must deal with parsing requests and responses for HTTP and HTTPS. In addition, it must deal with post page load AJAX and WebSocket calls. Because of the evolution of RIA (Rich Interactive Applications) in the browser and the popularity of encryption on the wire, for the most part this type of instrumentation has become obsolete
  Agent side "injection—this approach requires an agent on the server to send the response. In general, the agent "injects" a bootstrap script in the response which loads instrumentation that ultimately times the page and sends a "beacon" to a backend analytics engine that consumes it.
  PassThru "injection"—this approach utilizes a device that is inline (e.g., a load balancing router or the like) that "injects" a script, or rewrites the script, on the wire. Typically, this device is placed near the location of the targeted server.
  Reverse proxy "injection"—this approach entails simply redirecting the request and the response to/from another server configured by the proxy. Like PassThru injection, the responsible device is typically placed near the location of the targeted server, with all content going to the server going through the device and CORS is handled.
  Browser Developer Tools—this approach is specifically built for developers and requires some configuration, which can often be very technical in nature. Exporting data is also difficult, as these tools are intended for localized use by a developer.
  Browser Plugins—this approach requires installation of a browser plugin which, like the developer tools for the browser, are very localized. In addition, they require manual installation and do not typically support exporting of the instrumentation data.

In other words, the existing approaches to APM EUM are controlled solely by the owner of the application and the end user never sees any of the results. In fact, the end user is frequently unaware that their browser is reporting performance metrics, which could be seen as a privacy concern. In addition, these solutions are generally difficult to setup and the performance information is mainly shared with stakeholders of the application. Further, real EUM data is often restricted from being accessed by quality assurance (QA) personnel, developers, and support personnel. Because the EUM system is implemented at the server side, this also makes it difficult to gauge the performance of other websites, such as those of partners, without using synthetics or locally enabling developer mode, which is far too technical for most users.

The techniques herein, therefore, introduce an EUM system whereby end users can control what is collected and to see the results locally, and can choose to share those results with other users, departments, and/or registered companies (known as collectors). In some aspects, the techniques herein even allow the end user to configure their own dashboards and analytics from the raw events collected by the EUM system. In addition, the EUM system introduced herein offers a flexible solution that is open, allowing QA personnel, developers, IT support, application stakeholders, and the like, to access the collected information. This mechanism can also be configurable, allowing collectors to register and build profiles that specify which types of events are of interest (e.g., high latency events, error events, certain business transactions, etc.).

Specifically, according to one or more embodiments described herein, webpage data for a webpage is downloaded by a web browser executed by a client device. The client device inserts instrumentation into the webpage data to collect event metrics for events associated with the webpage. The client device selects, based on a user-defined policy, a set of event metrics from among the collected event metrics to be shared with a proxy service. The client device sends the selected set of event metrics to the proxy service. The proxy service provides access to the set of event metrics to one or more collectors registered with the proxy service.

Operationally, the techniques herein introduce an EUM system that applies instrumentation to web pages, to monitor performance during loading of the page, as well as the performance of post-load events, such as asynchronous web service calls (e.g., AJAX calls, WebSocket calls, etc.). In turn, the EUM system generates metrics for these events in a manner that is easy for the user to understand.

Figure 6:
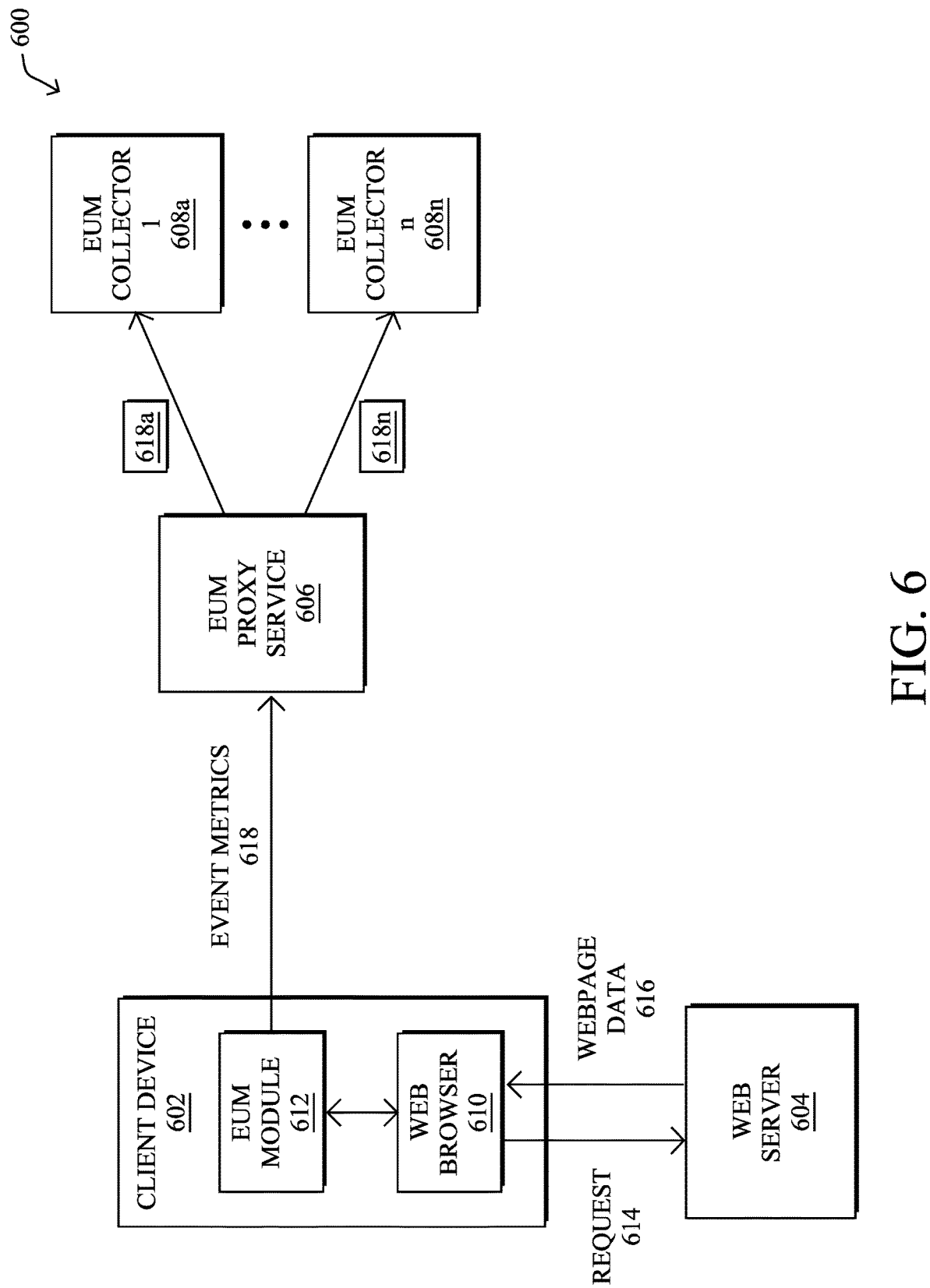
FIG. 6 illustrates an example end user monitoring (EUM) architecture.

FIG. 6 illustrates an example EUM architecture 600, according to various embodiments. As shown, architecture 600 may generally include a client device 602 (e.g., a personal computer, a cellular phone, a tablet, etc.) and a web server 604 that is communicatively coupled to client device 602 via one or more communication networks. In various embodiments, client device 602 may also be in communication with an EUM proxy service 606 via one or more communication networks. Similarly, any number of EUM collectors 608 (e.g., a first through $n^{th}$ EUM collector) may be in communication with EUM proxy service 606 via any number of communication networks.

During operation, client device 602 may execute a web browser 610, to interact with web server 604. For example, web browser 610 may take the form of Internet Explorer™, Firefox™, Safari™, Chrome™ or other Chromium™-based browser, Opera™, or the like. In addition, client device 602 may execute EUM module 612 which may take the form of a downloadable browser extension for web browser 610, in a preferred embodiment. In further embodiments, EUM module 612 may take the form of a separate agent that operates in conjunction with web browser 610 or its functionality integrated directly into web browser 610. In yet another embodiment, EUM module 612 may run as a Tomcat web application.

In various embodiments, EUM proxy service 606 may be deployed as a cloud service or, alternatively, as an on-premise ("on prem") service. For example, EUM proxy service 606 may be built using Java 8+ and may utilize port 8088 or the like. Thus, in cases in which EUM module 612 is implemented as a browser extension, web browser 610 may download and install EUM module 612 from EUM proxy service 606 or from another source, such as an application store.

According to various embodiments, EUM module 612 may allow the user of client device 602 to specify an EUM policy to be enforced by EUM module 612. For example, EUM module 612 may receive the user-defined policy via a user interface of client device 602 or via a network connection, as in the case of an administrator of client device 602 specifying the EUM policy.

As shown, when the user of client device 602 operates web browser 610 to access an application webpage served by web server 604, web browser 610 may send a request 614 to web server 604 for the webpage. In response, web server 604 may return webpage data 616 to web browser 610.

In various embodiments, when web browser 610 receives webpage data 616, EUM module 612 may insert instrumentation into webpage data 616, to collect event metrics for events associated with the webpage. In one embodiment, EUM module 612 may instrument webpage data 616 according to the user-defined EUM policy. For example, the policy may specify that all webpages accessed by client device 602 are to be instrumented or that only specific webpages are to be instrumented. In a further embodiment, EUM module 612 may instrument webpage data 616 based on an indication to do so included in webpage data 616. For example, if the uniform resource locator (URL) of the webpage contains "OpenEUM=true" or a similar indication, EUM module 612 may determine that webpage data 616 is to be instrumented.

To instrument webpage data 616, EUM module 612 may insert one or more scripts, such as JavaScript-based instrumentation (e.g., that uses the Nav Timing API), into webpage data 616, allowing EUM module 612 to collect various event metrics regarding the webpage. In some embodiments, EUM module 612 may do so, prior to web browser 610 loading webpage data 616. This allows EUM module 612 to collect page load event metrics during the loading of the webpage by web browser 610. In further embodiments, the instrumentation inserted into webpage data 616 may also collect event metrics regarding events that occur after web browser 610 has loaded the webpage. For example, such post-load events may include server calls, such as AJAX and WebSocket calls.

Thus, in the case in which EUM module 612 takes the form of a browser extension for web browser 610, the extension may responsible for attaching JavaScript instrumentation to the main page being loaded in the browser. Essentially, that instrumentation is 'cached' in the Extension background script and then sent to the Extension content script to be attached to the web page. Then, when the inserted instrumentation executes, it may collect event metrics by leveraging functionality built into web browser 610. For example, the instrumentation may use the Nav Timing application programming interface (API) built into many common browsers.

Figure 7:
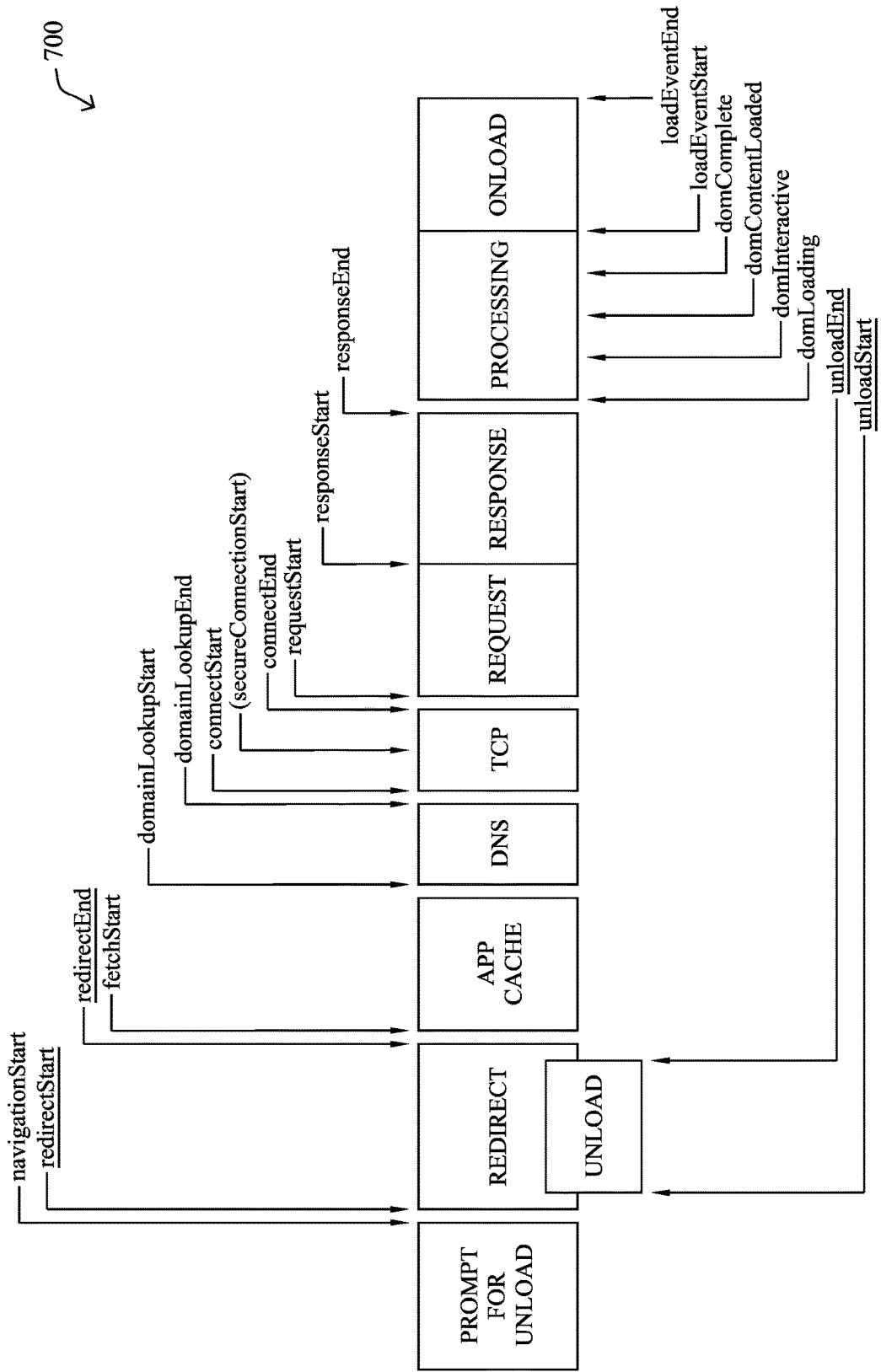
FIG. 7 illustrates an example diagram of calculations by EUM instrumentation.

FIG. 7 illustrates an example diagram 700 of calculations that may be performed by the instrumentation inserted into webpage data by EUM module 612, according to various embodiments. As shown, the instrumentation may capture any or all of the following metrics during the loading of the webpage:
navigationStart
redirectStart
redirectEnd
unloadEnd unloadStart
fetchStart
domainLookupStart
domainLookupEnd
connectStart
secureConnectionStart, if an encrypted session is used
connectEnd
requestStart
responseStart
responseEnd
domLoading
domInteractive
domContentLoaded
domComplete
loadEventStart
loadEventEnd In other words, by attaching instrumentation to the main page being loaded by the web browser, the EUM module is able to capture various metrics regarding the loading of the webpage. From the above metrics, the instrumentation may calculate various aggregated metrics. For example, the instrumentation may compute any or all of the following:
 DNS load time
 Browser time
 Network time
 Server time
Doing so allows the EUM module to break down the various metrics into the above latency categories. For webservice latency and error detection, the instrumentation may 'wrap' the AJAX and/or WebSocket connections and send calls, to report on their overall latency and errors.

Further page load event metrics that the instrumentation may collect can include, but are not limited to, any or all of the following:
 The URL being accessed by web browser 610
 An event ID
 The number of links on the page being loaded
 The number of images on the page being loaded
 The number of forms on the page being loaded
 The number of times the page was visited
 The OS of client device 602
 An error count
 A cumulative page load latency measurement (e.g., browser+DNS+Network+Server latencies)
 DNS latency
 Network latency
 Server latency
 Browser latency
 Timestamp information With respect to post-loading server events, the instrumentation may collect any or all of the following (e.g., for AJAX or WebSocket calls):
 Summary information (e.g., 'Reporting AJAX web service call event')
 Message information (e.g., 'AJAX web service call (send) to http://foo.foo took 15007 ms with status 200')
 User information
 URL information
 An event identifier
 Extra information (e.g., 'TargetURL: http://foo.foo Latency=150007 CallStatus: 200')
 Error information
 Timestamp information As would be appreciated, the specific set of event metrics collected by the instrumentation can be selected as desired. In addition, the techniques herein can be easily extended to capture new metrics as well, such as with the introduction of new protocols.

Referring again to FIG. 6, another key aspect of EUM architecture 600 is the ability to share any or all of the event metrics 618 captured by EUM module 612 with EUM proxy service 606 (e.g., a proxy server). In some embodiments, EUM module 612 may do so according to the user-defined policy for EUM module 612. For example, the user of client device 602 may opt to share all of the event metrics collected by EUM module 612, a subset of the metrics, or not at all, in some cases. In further embodiments, EUM module 612 may decide whether to report event metrics 618 to EUM proxy service 606 based on one or more conditions. For example, EUM module 612 may report event metrics 618 to EUM proxy service 606 when a measured latency exceeds a predefined threshold or when an error occurred.

According to various embodiments, one or more EUM collectors 608 may register with EUM proxy service 606, to access any or all of the event metrics 618 reported to EUM proxy service 606 by EUM module 612. Such collectors may, for instance, take the form of web services associated with the parties interested in receiving metrics for the website served by web server 604 (e.g., the provider of the webpage, partners of the webpage provider, etc.). For example, EUM proxy service 606 may check the page URL associated with event metrics 618, to determine whether any of EUM collectors 608 are registered to monitor the webpage. If so, EUM proxy service 606 provides the event metrics 618 to those collector(s) 608, based on their registrations. For example, a given EUM collector 608 may register to receive event metrics 618 for the webpage served by web server 604 when an error event occurs, when a latency metric in the collected event metrics 618 exceeds a threshold specified by that EUM collector 608, or under any other specified conditions.

In various embodiments, EUM module 612 may also allow the user of client device 602 to review the event metrics collected by EUM module 612. In some embodiments, EUM module 612 may provide an indication of the collected event metrics to the user of client device 602 via web browser 610 (e.g., as a local webpage, a popup window, etc.). For example, EUM module 612 may cause web browser 610 to display the raw metrics and/or aggregated data regarding the event metrics (e.g., in the form of pie charts, histograms, etc.).

As would be appreciated, in contrast to existing EUM solutions, EUM architecture 600 allows the end user to 'have a say' in what is collected, as well as the ability to review the collected data locally. This results in better privacy for the user and support collaboration. In addition, EUM architecture 600 offers a 'light' and flexible solution to provide metrics to parties that would not typically have access to this data, such as QA personnel, IT support, and application teams. Further, in some embodiments, EUM architecture 600 also allows any of the consumers of the metrics to construct their own dashboards or analytics (e.g., EUM collector 608a may use its received event metrics 618a to perform its own analytics, etc.). In addition, EUM architecture 600 is highly flexible, allowing the consumers of the metrics to specify which of the captured event metrics they wish to receive (e.g., EUM collector 608a may opt to receive event metrics when high latency is detected, errors are detected, certain business transactions occur, etc.).

A number of use cases become possible using EUM architecture 600. In a first example use case, assume that the user of client device 602 calls a help desk worker to report that the website served by web server 604 is loading slowly. To help diagnose the issue, the person working the help desk worker may instruct the user of client device 602 to download and install EUM module 612 (e.g., a browser extension) and register with EUM proxy service 606. Once installed, the help desk worker may guide the user of client 602 through the configuration of EUM module 612, thereby allowing EUM module 612 to report event metrics 618 to EUM proxy service 606. By accessing EUM proxy service 606 via one of EUM collectors 608, the help desk worker is then able to review event metrics 618 for any issues. In addition, the help desk worker can forward a report to a partner or simply register another EUM collector 608, to perform their own testing.

In another example use case, assume that a sales representative wants to sell access to the EUM solution introduced herein, but the prospective customer does not have the IT resources to evaluate a proof of concept demonstration. Since the solution introduced herein is highly flexible, the sales representative can simply set a trigger on slow page loads or web service calls, to quickly generate an example report to show.

In a further example use case, assume that the QA team of a company wants to compare page and web service call latencies against predefined thresholds and flag any long latencies. In addition, they wish to do so for each occurrence on an individual basis. However, assume now that the current APM suite in use by the company is for production only. Using the techniques herein, the QA team can easily set up their own EUM proxy service or register as an EUM collector 608 of an existing EUM proxy service, to receive their desired metrics.

In yet another use case, assume now that the EUM techniques herein are implemented in a production system for a website. Doing so allows for different EUM collectors 608 to be set up for different IT support groups (e.g., to review slow-loading pages, slow webservice calls, etc.). In addition, customers can opt to download EUM module 612 so that problems with the website can be reported and diagnosed.

A prototype EUM system was constructed, to demonstrate the efficacy of the techniques herein. In the prototype, EUM module 612 was implemented as a browser extension for the Chrome browser and manually installed. It is anticipated that such an extension may be made publicly downloadable via the browser (e.g., via a web store for browser extensions). Once downloaded and installed, the user is asked to enter a username and indicate the EUM proxy server with which to register. FIGS. 8-14 illustrate details of the built EUM prototype system.

FIG. 8 illustrates an example EUM browser extension menu 800 for the prototype system. As shown, EUM browser extension menu 800 includes the following menu options:

Update OpenEUM Instrumentation—this will update the instrumentation in the extension by download from the EUM proxy server.

Measure Performance for every page—this will instrument every page and share the metrics with the proxy server, based on other criteria.

Execute and measure Performance on this page now—this will instrument and execute the URL on the current page in the browser (i.e., an instrumentation on demand option).

Show Performance Chart After Execution—this will cause a popup for any 'shared metrics' in the form of a pie chart.

Send Performance Events After Execution—this will cause metrics to be sent for any "shared metrics" to the EUM proxy server to be stored and potentially forwarded to EUM collectors.

Only Show Charts (if enabled) and Send Events (if enabled) for Slow Pages—this restricts 'shared metrics' (in the form of a popup or sent metric) unless the page load latency exceeds the threshold set on the proxy server.

Figure 9:
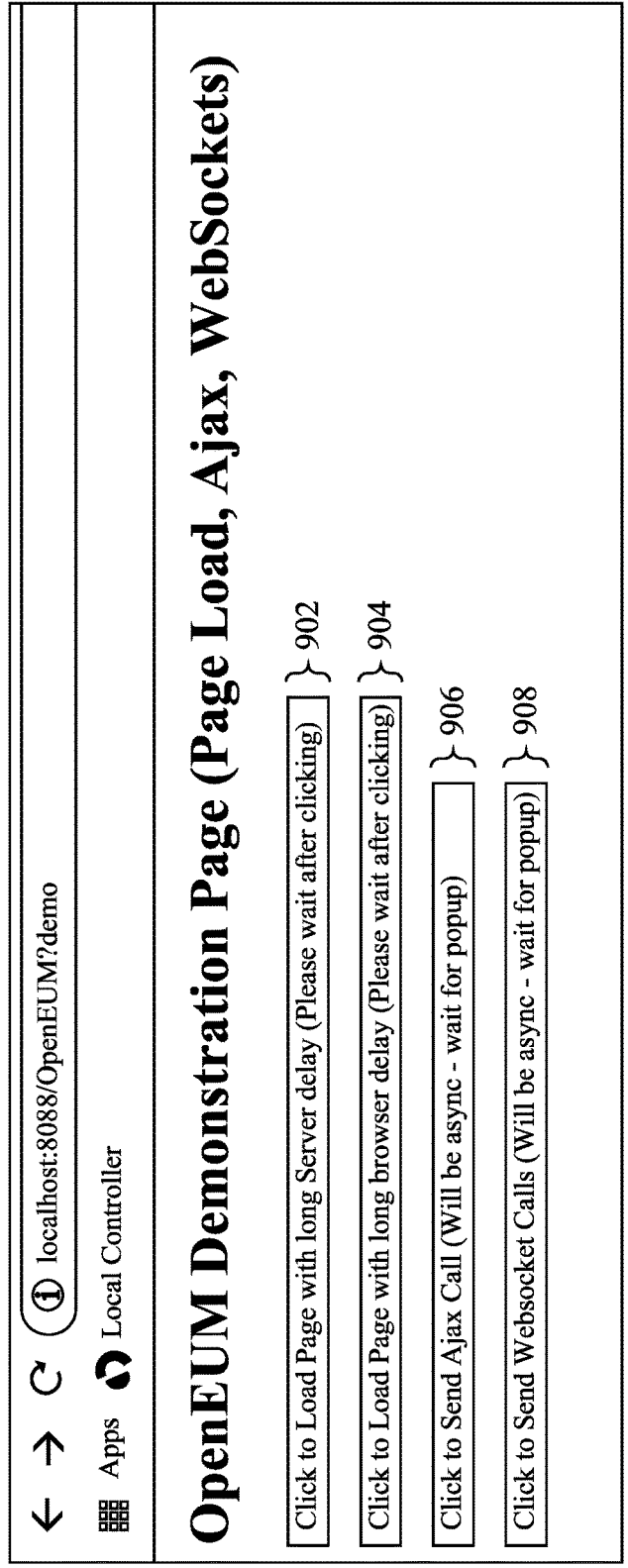
FIG. 9 illustrates an example test webpage for a prototype EUM system.

FIG. 9 illustrates an example test webpage 900 for the prototype system, in various embodiments. As shown, test webpage 900 was loaded locally on the client device and includes a number of options: a first option 902 to test page loading with a long server delay, a second option 904 to test page loading with a long browser delay, a third option 906 to test sending an AJAX call, and a fourth option 908 to test sending WebSocket calls.

Figure 10A:
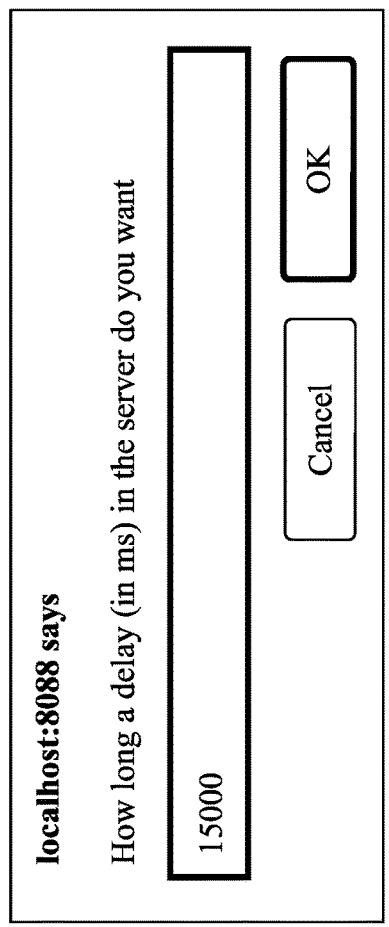
FIGS. 10A-10B illustrate example graphical user interfaces (GUIs) to view server delay metrics on a client device.
Figure 10B:
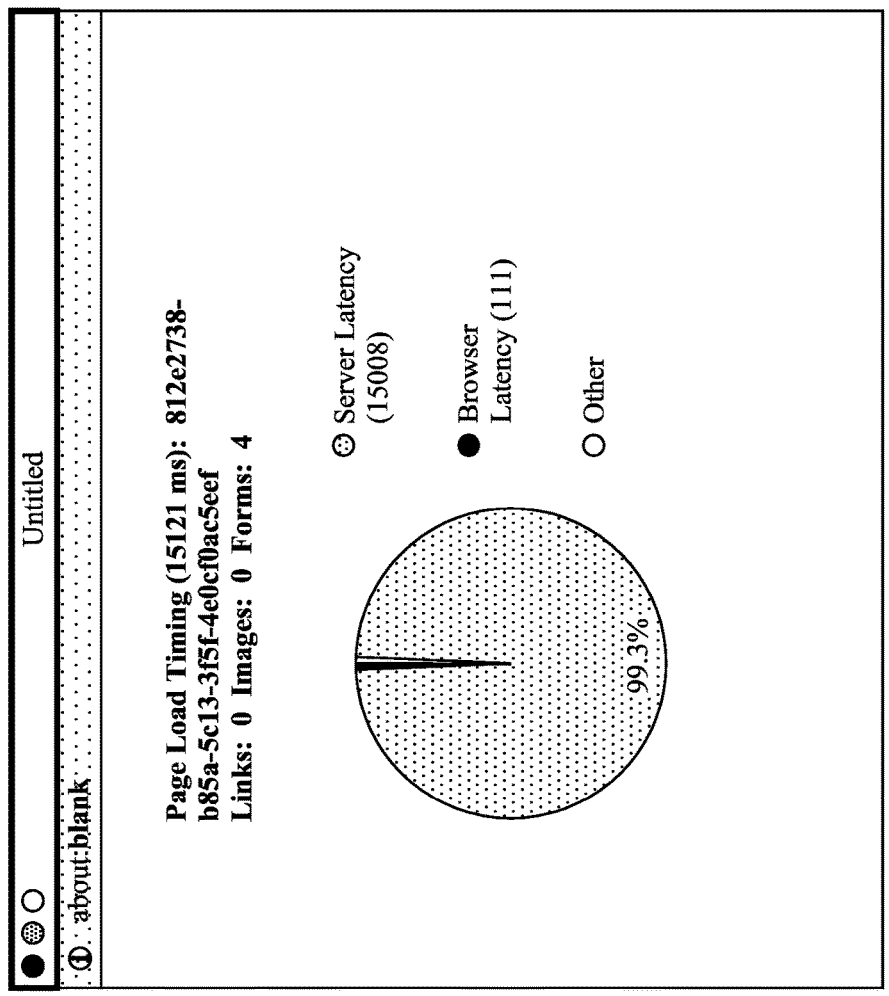

FIGS. 10A-10B illustrate example graphical user interfaces (GUIs) to view server delay metrics on a client device. More specifically, FIGS. 10A-10B illustrate the GUIs presented by the prototype EUM system when option 902 of test webpage 900 in FIG. 9 is selected. As shown in FIG. 10A, the user is presented with GUI 1000 which asks the user to specify an amount of server delay (in ms) to simulate. In turn, as shown in FIG. 10B, the EUM system returns GUI 1010 (e.g., a popup window) showing the captured page load latencies as a pie chart that breaks down the various latencies by type (e.g., server latency, browser latency, etc.). Since a very high server delay was specified, the vast majority of the overall delays were attributable to server latency.

Figure 11A:
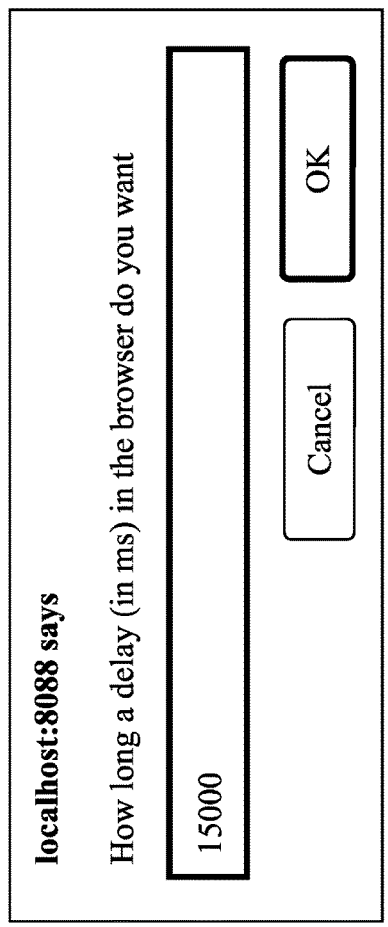
FIGS. 11A-11B illustrate example GUIs to view browser delay metrics on a client device.
Figure 11B:
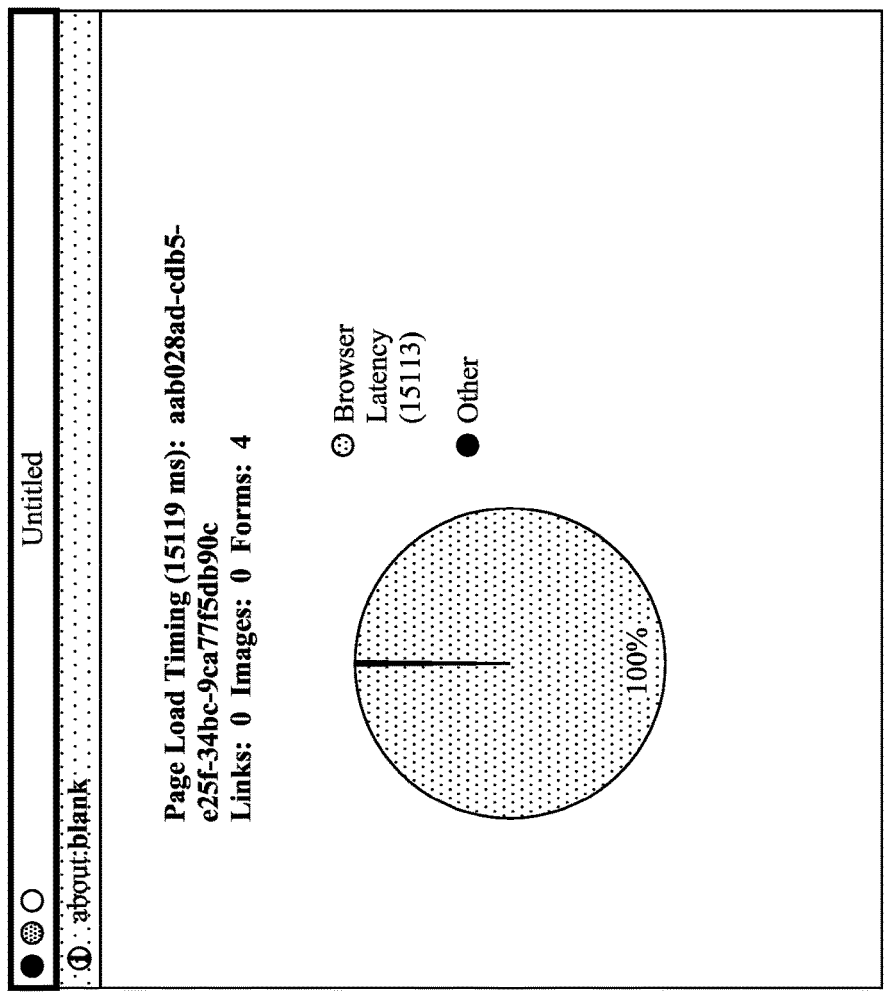

FIGS. 11A-11B illustrate example GUIs to view browser delay metrics on a client device. More specifically, FIGS. 11A-11B illustrate the GUIs presented by the prototype EUM system when option 904 of test webpage 900 in FIG. 9 is selected. As shown in FIG. 11A, the user is presented with GUI 1100 which asks the user to specify an amount of browser delay (in ms) to simulate. GUI 1100 also includes an option to enter a value of '−1' to simulate an outright error. In turn, as shown in FIG. 11B, the EUM system again returns GUI 1110 (e.g., a popup window) showing the captured page load latencies as a pie chart that breaks down the various latencies by type. Here, the browser latency makes up the vast majority of the overall latency for the webpage.

Figure 12A:
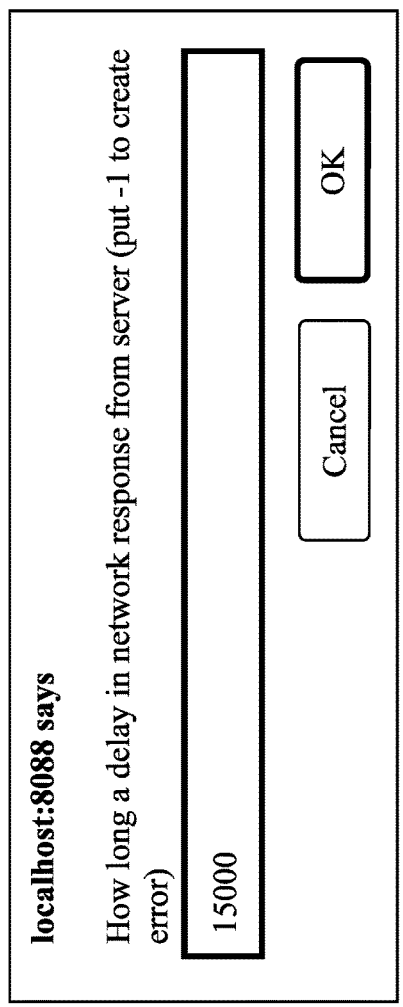
FIGS. 12A-12B illustrate example GUIs to view AJAX call metrics on a client device.
Figure 12B:
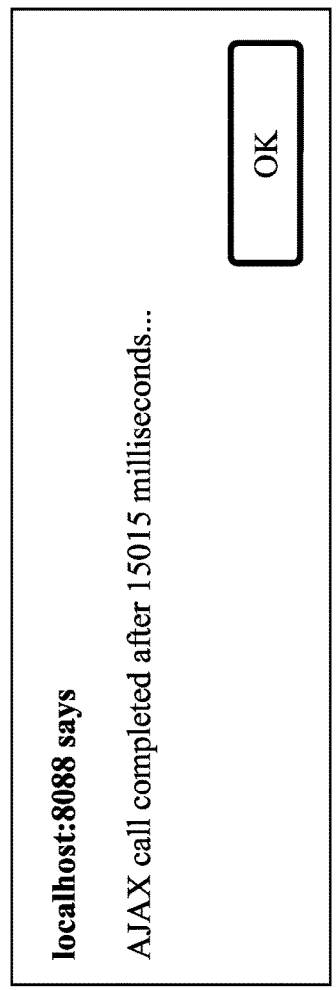

FIGS. 12A-12B illustrate example GUIs to view AJAX call metrics on a client device. More specifically, FIGS. 12A-12B illustrate the GUIs presented by the prototype EUM system when option 906 of test webpage 900 in FIG. 9 is selected. As shown in FIG. 12A, the user is presented with GUI 1200 which asks the user to specify an amount of network response delay (in ms) to simulate for the AJAX calls. In turn, as shown in FIG. 12B, the EUM system presents a GUI 1210 as a popup after fifteen seconds and indicates the number of AJAX calls completed in this time. Since a server delay of 15000 ms was specified, none have completed, at this point.

Figure 13A:
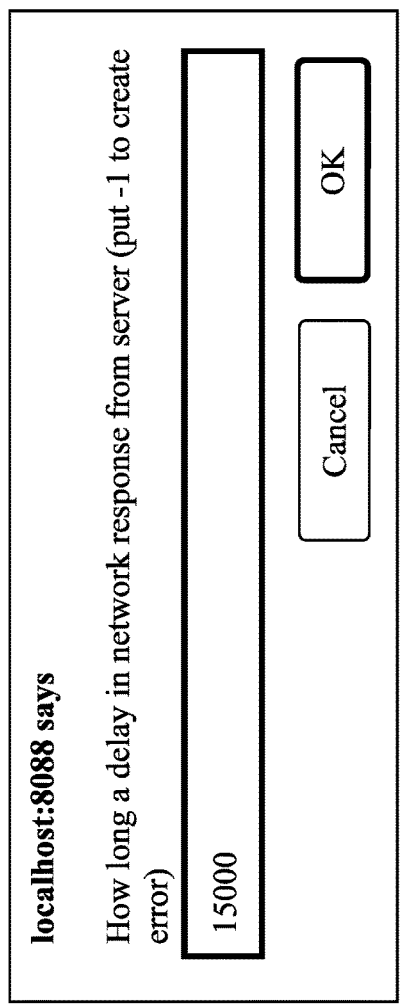
FIGS. 13A-13B illustrate example GUIs to view Web-Socket call metrics on a client device.
Figure 13B:
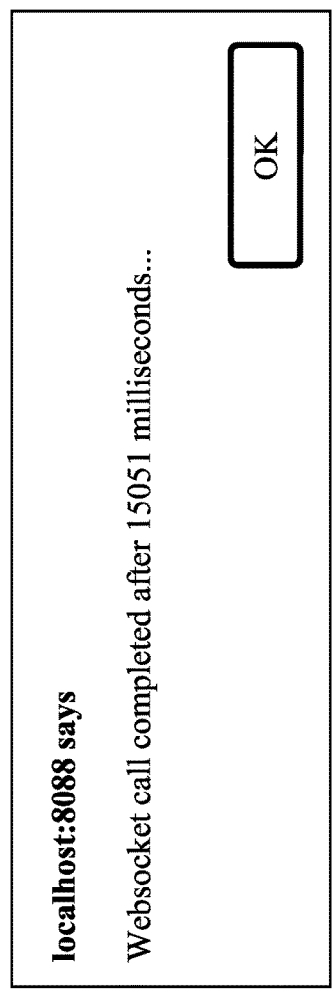

FIGS. 13A-13B illustrate example GUIs to view WebSocket call metrics on a client device. More specifically, FIGS. 12A-12B illustrate the GUIs presented by the prototype EUM system when option 908 of test webpage 900 in FIG. 9 is selected. As shown in FIG. 13A, the user is presented with GUI 1200 which asks the user to specify an amount of network response delay (in ms) to simulate for the WebSocket calls. In turn, as shown in FIG. 13B, the EUM system presents a GUI 1210 as a popup after fifteen seconds and indicates the number of WebSocket calls completed in this time. Since a server delay of 15000 ms was specified, none have completed, at this point.

FIG. 14 illustrates an example menu 1400 for managing the prototype EUM proxy server. As shown, menu 1400 includes various options to show the current statistics collected by the proxy server, the configuration of the proxy server, log information for the proxy server, and a listing of the EUM collectors registered with the proxy server. In addition, menu 1400 includes options to show the page load and web service call event metrics collected by the proxy server, either in temporal order or sorted by latency. Further options of menu 1400 include an option to register a new user with the EUM system, an option to register a new EUM collector with the proxy server, and options to test the prototype system.

FIG. 15 illustrate an example GUI 1500 to register an EUM collector with an EUM proxy service, as part of the prototype system. As shown, the collector registration requires two pieces of information:

The URL for which the event metrics are to be reported to the EUM collector (e.g., the URL of the webpage of interest to the collector), and The URL of the EUM collector that is to receive the collected metrics.

Figure 16:
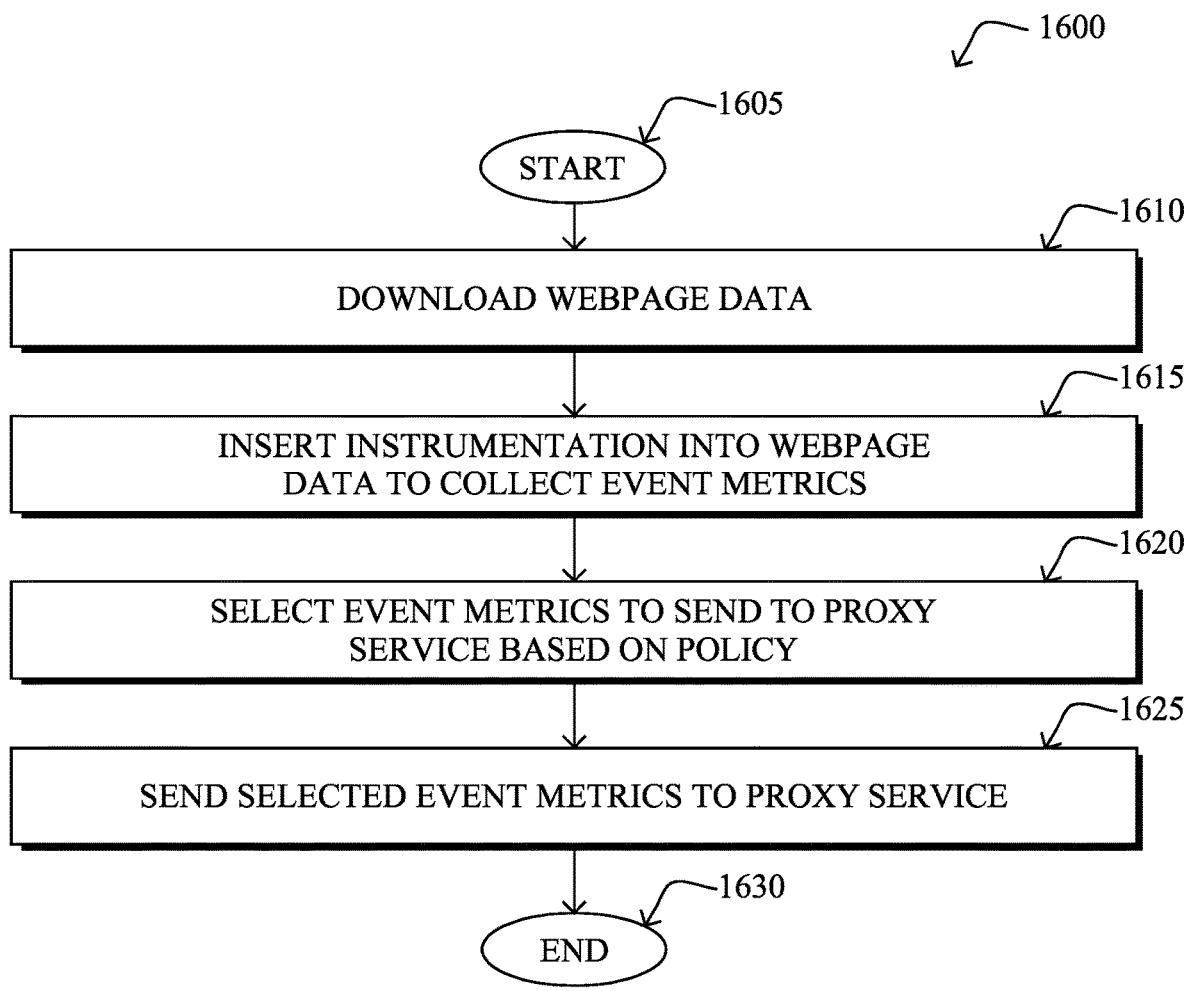
FIG. 16 illustrates an example simplified procedure for implementing user-configurable EUM on a client device, in accordance with one or more embodiments described herein.

As part of the prototype system, the proxy server maintained a file using a key/value map that associates EUM collectors with the event metrics they are to receive. A snippet of the Java Servlet to process this mapping is as follows:

private String processEvent(boolean isProxy, HttpServletRequest req, HttpServletResponse res) throws IOException {
try {
ObjectMapper mapper=new ObjectMapper( );
Map<String, Object>jsonMap=mapper.readValue (req.getInputStream( ), Map.class);

Likewise, the raw JSON for the event collection and reporting used in the prototype is as follows:
For PageLoad:
Type=PageLoad, User=Ted, URL=http://foo.foo/testPage.html&OpenEUM=true&brdelay=15000, Id=8f7244abb3ee-bf04-a76a-1f37e2e9fbec, Links=0, Images=0, Forms=4, History=18, OS=MacIntel, ErrorCount=0, Latency=15121, DNSTime=0, NetworkTime=4, ServerTime=4, BrowserTime=15113, Errors=[   ], Time=1558444026046, Collector=None
For WebService:
Type=WebServiceCall, Summary=Reporting Ajax Web Service Call Event, Message=Ajax Web Service Call (Send) to https://clickstream-killswitch.hd-personalization-prod.gcp.foo.foo/clickstream-killswitch/v1/detail took 521 ms with status 200, User=Ted, URL=https://www.foo.foo/, Id=80c6af41-909f-eaf6-67f5-extra=TargetURL: https://clickstream-killswitch.hd-personalization-prod.gcp.foo.foo/clickstream-killswitch/v1/detail, Latency: 521,CallStatus: 200, error=false, Time=1558444393641, Collector=www.foo.foo The configuration for the prototype EUM proxy server is also as follows:
show.instrumentation.errors=true—show any instrumentation errors
show.page.errors=false—show any page errors
instrumentation.send.events.url=$SERVER URL/OpenEUM?events—send events to this OpenEUM Proxy Server URL
instrumentation.max.cached.events=100—number of events to cache/store
slow.page.threshold=500—threshold for a slow page
slow.webservice.threshold=500—threshold for a slow webservice
log.posts=true—log the posts for debugging

Notifications

email-smtp-server: smtp.foo.foo—smtp server for email
email-smtp-ssl-port: 465—smtp server port for email
email-from: OpenEUM@foo.foo—smtp mail account to use for email
email-password: OpenEUM2019—smtp mail account password to use for email In closing, FIG. 16 illustrates an example simplified procedure for implementing user-configurable EUM on a client device, in accordance with one or more embodiments described herein. For example, a non-generic, specifically configured device (e.g., device 200, particularly a monitoring device) may perform procedure 1600 by executing stored instructions (e.g., monitoring process 248). The procedure 1600 may start at step 1605, and continues to step 1610, where, as described in greater detail above, the client device may download webpage data for a website.

At step 1615, as detailed above, the client device may insert instrumentation into the webpage data to collect event metrics for events associated with the webpage. In some embodiments, the instrumentation may comprise a script, such as a JavaScript, inserted into the webpage data, prior to the web browser loading the webpage data. In various embodiments, the events for which the metrics are collected may comprise server events, such as AJAX or WebSocket calls made by the webpage after being loaded by the web browser. In further embodiments, the events may also comprise one or more page load events (e.g., to gather latency metrics during the page loading). In some embodiments, the use of the instrumentation may also be based on a user-defined policy (e.g., specifying instrumentation for all URLs, a particular set of URLs, the current URL, etc.).

At step 1620, the client device may select, based on a user-defined policy, a set of event metrics to be shared with a proxy service from among the collected event metrics, as described in greater detail above. In some embodiments, such a policy may specify that event metrics for error events are to be shared with the proxy service. In another embodiment, the user-defined policy may specify that event metrics should be shared with the proxy service when a latency metric exceeds a predefined threshold. In further embodiments, the user-defined policy may specify that the metrics are not to be shared at all or, alternatively, only a subset of the captured metrics are to be shared.

At step 1625, as detailed above, the client device may send the selected set of event metrics to the proxy service. In turn, in various embodiments, the proxy service may provide access to the set of event metrics to one or more collectors registered with the proxy service. Procedure 1600 then ends at step 1630.

It should be noted that while certain steps within procedure 1600 may be optional as described above, the steps shown in FIG. 16 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a user-configurable EUM system. In particular, the techniques herein introduce an EUM solution that is centered on the client device and affords the end user the ability to control what metrics are collected and shared with others, as well as the ability to review the collected metrics. In further aspects, the techniques herein allow interested parties to register with a proxy server/service, to receive the metrics collected by the client device.

Illustratively, the techniques described herein may be performed by hardware, software, and/or firmware, such as in accordance with the illustrative monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise: downloading, by a web browser executed by a client device, webpage data for a webpage. The method also comprises inserting, by the client device, instrumentation into the webpage data to collect event metrics for events associated with the webpage. The method further comprises selecting, by the client device and based on a user-defined policy, a set of event metrics from among the collected event metrics to be shared with a proxy service. The method further comprises sending, by the client device, the selected set of event metrics to the proxy service, wherein the proxy service provides access to the set of event metrics to one or more collectors registered with the proxy service.

In one embodiment, the events comprise an AJAX or WebSocket call made by the webpage after being loaded by the web browser. In a further embodiment, the events comprise one or more load events. In yet another embodiment, inserting the instrumentation into the webpage data to collect event metrics for events associated with the webpage comprises inserting a script into the webpage data, prior to the web browser loading the webpage data. In an additional embodiment, the method may further comprise receiving, at the client device, the user-defined policy from a user interface of the client device. In a further embodiment, the instrumentation is inserted into the webpage data, based on the user-defined policy. In yet another embodiment, the user-defined policy specifies that event metrics for error events are to be shared with the proxy service. In another embodiment, the user-defined policy specifies that the event metrics are to be shared with the proxy service when a latency associated with the webpage exceeds a predefined threshold. In a further embodiment, the method also comprises providing, by the client device, an indication of the collected event metrics via the web browser. In yet another embodiment, the method further comprises downloading, by the client device, a browser extension for the web browser, wherein the browser extension performs the inserting, selecting, and sending steps. In another embodiment, the method further comprises displaying, on the client device, a popup describing the performance of the currently downloaded web page.

According to the embodiments herein, a tangible, non-transitory, computer-readable medium herein may have computer-executable instructions stored thereon that, when executed by a processor on a computer, may cause the computer to perform a method comprising: downloading, by a web browser executed by the device, webpage data for a webpage. The method also comprises inserting, by the device, instrumentation into the webpage data to collect event metrics for events associated with the webpage. The method further comprises selecting, by the device and based on a user-defined policy, a set of event metrics from among the collected event metrics to be shared with a proxy service. The method also comprises sending, by the device, the selected set of event metrics to the proxy service, wherein the proxy service provides access to the set of event metrics to one or more collectors registered with the proxy service.

Further, according to the embodiments herein an apparatus herein may comprise: one or more network interfaces to communicate with a network; a processor coupled to the network interfaces and configured to execute one or more processes; and a memory configured to store a process executable by the processor, the process, when executed, configured to download, by a web browser executed by the apparatus, webpage data for a webpage. The process is also configured to insert instrumentation into the webpage data to collect event metrics for events associated with the webpage. The process is further configured to select, based on a user-defined policy, a set of event metrics from among the collected event metrics to be shared with a proxy service. The process is additionally configured to send the selected set of event metrics to the proxy service, wherein the proxy service provides access to the set of event metrics to one or more collectors registered with the proxy service.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   downloading, by a web browser executed by a client device, webpage data for a webpage from a web server;
   downloading, by the client device, a browser extension for the web browser from a proxy service;
   inserting, by the client device, instrumentation into the webpage data to collect event metrics for events associated with the webpage;
   selecting, by the client device and based on a user-defined policy configured by an end user of the client device, a first set of event metrics from among the collected event metrics to be shared with the proxy service;
   determining, by the client device and based on the user-defined policy, a second set of event metrics from among the collected event metrics that is not to be shared with the proxy service; and
   sending, by the client device, the first set of event metrics, and not the second set of event metrics, to the proxy service, wherein the proxy service provides access to the first set of event metrics to one or more collectors registered with the proxy service,
   wherein the browser extension performs the inserting, selecting, and sending steps.

2. The method as in claim 1, wherein the events comprise an AJAX or WebSocket call made by the webpage after being loaded by the web browser.

3. The method as in claim 1, wherein the events comprise one or more page load events.

4. The method as in claim 1, wherein inserting the instrumentation into the webpage data to collect event metrics for events associated with the webpage comprises:
   inserting a script into the webpage data, prior to the web browser loading the webpage data.

5. The method as in claim 1, further comprising:
   receiving, at the client device, the user-defined policy from a user interface of the client device.

6. The method as in claim 1, wherein the instrumentation is inserted into the webpage data, based on the user-defined policy.

7. The method as in claim 1, wherein the user-defined policy specifies that event metrics for error events are to be shared with the proxy service.

8. The method as in claim 1, wherein the user-defined policy specifies that the event metrics are to be shared with the proxy service when a latency associated with the webpage exceeds a predefined threshold.

9. The method as in claim 1, further comprising:
   providing, by the client device, an indication of the collected event metrics via the web browser.

10. The method as in claim 1, wherein the instrumentation, when executed, collects the event metrics using an application programming interface (API) of the webpage.

11. The method as in claim 1, further comprising:
    displaying, on the client device, a popup describing the performance of the webpage.

12. An apparatus, comprising:
    one or more network interfaces to communicate with a network;
    a processor coupled to the network interfaces and configured to execute one or more processes; and
    a memory configured to store a process executable by the processor, the process, when executed, configured to:
      download, by a web browser executed by the apparatus, webpage data for a webpage from a web server;
      download a browser extension for the web browser from a proxy service;
      insert instrumentation into the webpage data to collect event metrics for events associated with the webpage;
      select, based on a user-defined policy configured by an end user of the apparatus, a first set of event metrics from among the collected event metrics to be shared with the proxy service;
      determine, based on the user-defined policy, a second set of event metrics from among the collected event metrics that is not to be shared with the proxy service; and
      send the first set of event metrics, and not the second set of event metrics, to the proxy service, wherein the proxy service provides access to the first set of event metrics to one or more collectors registered with the proxy service,
    wherein the browser extension performs the inserting, selecting, and sending.

13. The apparatus as in claim 12, wherein the events are selected from a group consisting of: an AJAX or WebSocket call made by the webpage after being loaded by the web browser; and one or more page load events.

14. The apparatus as in claim 12, wherein the apparatus inserts the instrumentation into the webpage data to collect event metrics for events associated with the webpage by:
    inserting a script into the webpage data, prior to the web browser loading the webpage data.

15. The apparatus as in claim 12, wherein the process when executed is further configured to:
    receive the user-defined policy from a user interface of the apparatus.

16. The apparatus as in claim 12, wherein the instrumentation is inserted into the webpage data, based on the user-defined policy.

17. The apparatus as in claim 12, wherein the user-defined policy specifies that event metrics for error events are to be shared with the proxy service or when a latency associated with the webpage exceeds a predefined threshold.

18. The apparatus as in claim 12, wherein the process when executed is further configured to:
provide an indication of the collected event metrics to a user interface of the apparatus via the web browser.

19. The apparatus as in claim 12, wherein the instrumentation is inserted into the webpage data by attaching the instrumentation to a main page of the webpage.

20. A tangible, non-transitory, computer-readable medium having computer-executable instructions stored thereon that, when executed by a processor on a device, cause the device to perform a method comprising:
downloading, by a web browser executed by the device, webpage data for a webpage from a web server;
downloading, by the device, a browser extension for the web browser from a proxy service;
inserting, by the device, instrumentation into the webpage data to collect event metrics for events associated with the webpage;
selecting, by the device and based on a user-defined policy configured by an end user of the device, a first set of event metrics from among the collected event metrics to be shared with the proxy service;
determining, by the device and based on the user-defined policy, a second set of event metrics from among the collected event metrics that is not to be shared with the proxy service; and
sending, by the device, the first set of event metrics, and not the second set of event metrics, to the proxy service, wherein the proxy service provides access to the first set of event metrics to one or more collectors registered with the proxy service,
wherein the browser extension performs the inserting, selecting, and sending steps.

* * * * *